United States Patent [19]

McGaughey, III et al.

[11] Patent Number: 4,977,520

[45] Date of Patent: Dec. 11, 1990

[54] METHOD TO FACILITATE A REPLY TO ELECTRONIC MEETING INVITATION IN AN INTERACTIVE MULTI-TERMINAL SYSTEM EMPLOYING ELECTRONIC CALENDARS

[75] Inventors: Harry S. McGaughey, III, Raleigh, N.C.; Lovie A. Melkus, Carrollton; Robert J. Torres, Colleyville, both of Tex.

[73] Assignee: IBM Corp., Armonk, N.Y.

[21] Appl. No.: 151,859

[22] Filed: Feb. 3, 1988

[51] Int. Cl.[5] .............................................. G06F 15/40
[52] U.S. Cl. ................................... 364/521; 364/518; 340/706; 368/29
[58] Field of Search ............... 340/721, 724, 723, 706, 340/825.55; 364/521, 518; 368/41, 29

[56] References Cited

U.S. PATENT DOCUMENTS

| | | | |
|---|---|---|---|
| 4,380,009 | 4/1983 | Lang et al. | 340/825.55 |
| 4,626,836 | 12/1986 | Curtis et al. | 340/706 |
| 4,713,780 | 12/1987 | Schultz et al. | 364/514 |
| 4,716,762 | 12/1987 | Yamaha | 340/721 |
| 4,769,637 | 9/1988 | Forrester et al. | 340/726 |
| 4,769,796 | 9/1988 | Levine | 368/29 |
| 4,807,154 | 2/1989 | Scully et al. | 364/518 |
| 4,831,552 | 5/1989 | Scully et al. | 364/518 |

Primary Examiner—Dale M. Shaw
Assistant Examiner—Phu K. Nguyen
Attorney, Agent, or Firm—Richard E. Cummins; James H. Barksdale

[57] ABSTRACT

An electronic calendaring method for use in a data processing system which includes a plurality of interactive terminals which are interconnected to permit an end user at each terminal to interchange information with each other and to maintain an electronic calendar. The method facilitates the reply process to an electronic invitation to attend a meeting that is issued by one of the end users by arranging for the system to advise the invitee that a meeting notice is available to review in the "In Box" of the terminal. The method causes a composite screen to be built which simultaneously displays the meeting details and the relevant section, i.e. a day of entries, of the owner's calendar in a side by side format so that calendar entries are correlated to the meeting data and time. The composite display permits an interactive selection by the calendar owner end user of at least one option which can be either to accept the invitation and calendar the meeting or to reject the invitation. In either event a reply is automatically sent to the end user that issued the invitation and the invitee is returned to the task that was being processed when the initial message was received.

10 Claims, 5 Drawing Sheets

```
                        MAIL
VIEW  COPY   ADD   DELETE   FIND   SORT   PRINT   SAVE   EXIT

DATE 12/21/87   IN BASKET FOR        I.M. AUSER

PRESS  F2.   THEN CHOOSE ACTION

SENDER          DESCRIPTION            TYPE        DATE
USER 2          CONTRACT               DOCUMENT    12/01/87
USER 10         DOCUMENT REQUEST       FOLDER      12/09/87
USER 4          FINANCIAL CONTRACTS    DOCUMENT    12/10/97
USER 1          DEPARTMENT MEETINGS    MEETING     12/21/87
USER 9          AREA BUDGET            BUDGETS     12/20/87

F1 = HELP;   F3 = EXIT;   F4 = LIST;
```

FIG. 3

```
                           MAIL
VIEW  COPY   ADD   DELETE   FIND   SORT   PRINT   SAVE   EXIT
MEETING NOTICE LINE [  1  ] OF  [27]  CALENDAR FOR I.M.AUSER
                                              12/31/87
DATE.....: 12/21/87              8:30a......................
                                 9:00a-10:00a STATUS MEETING
FROM.....: USER 1
                                 10:30a.....................
SUBJECT..: DEPT. MEETINGS        11:00a-12:00a EDITOR MEETING

TO.......: I.M. AUSER            12:00n.....................
           U.R. NOUSER           12:30p.....................
           USER 4                1:00p......................
           USER 8                1:30p......................
                                 2:00p......................
                                 2:30p......................
                                 3:00p4:00p WORK ACTIVITIES
MEETING DATE: 12/31/87           4:00p-4:15p PICK UP TICKETS
START TIME: 1:00p END TIME:2:30p 4:30p......................
LOCATION:  CONFERENCE ROOM 715   5:00p......................
```

FIG. 4

```
                              MAIL
 VIEW   COPY   ADD   DELETE   FIND   SORT   PRINT   SAVE   EXIT
 MEETING NOTICE LINE [  1  ] OF  [27]  CALENDAR FOR I.M.AUSER
                                                12/31/87
 DATE.....: 12/21/87                  8:30a......................
                                      9:00a-10:00a STATUS MEETING
 FROM.....:  USER 1
                                      10:30a.....................
 SUBJECT..:  DEPT. MEETINGS            11:00a-12:00a EDITOR MEETING

TO.......:  I.M. AUSER                12:00n.....................
             U.R. NOUSER                12:30p.....................
             USER 8                    1:00p DEPARTMENT MEETING
             USER 7                    1:30p
                                       2:00p
                                       2:30p......................
                                       3:00P-4:00p WORK ACTIVITIES
 MEETING DATE: 12/31/87                 4:00p-4:15p PICK UP TICKETS
 START TIME: 1:00p END TIME:2:30p       4:30p......................
 LOCATION:   CONFERENCE ROOM 715        5:00p......................
```

FIG. 5

METHOD TO FACILITATE A REPLY TO ELECTRONIC MEETING INVITATION IN AN INTERACTIVE MULTI-TERMINAL SYSTEM EMPLOYING ELECTRONIC CALENDARS

CROSS-REFERENCES TO RELATED APPLICATION

1. Co-pending application Ser. No. 008,039, filed Jan. 29, 1987, entitled "Electronic Calendaring Method to Establish Calendar Floating Triggers for Calendared Events and Processes" and assigned to the assignee of this application is directed to an electronic calendaring method in which a calendar owner can selectively trigger a predefined action and response to detecting one or more criteria related to the calendar event that has previously been defined and entered into the system.

2. U.S. Pat. No. 4,807,154, issued Feb. 21, 1989, Ser. No. 008,033, filed Jan. 29, 1987, entitled "Method For Developing Automatic Replies in an Interactive Electronic Calendaring System," and assigned to the assignee of the present application is directed to an electronic calendaring method in which a calendar owner can respond automatically to requests for participation in events being calendared by another person. The nature of the reply is based on an analysis of the parameters set forth in the request and an algorithm employing a set of prioritized criteria that the calendar owner has established to provide the automatic response.

3. Co-pending application Ser. No. 008,034, filed Jan. 29, 1987 entitled "Method For Concurrently Displaying Entries From a Plurality of Different Electronic Calendars Based on Interactively Entered Criteria," and assigned to the assignee of the present application is directed to an electronic calendaring method in which a calendar owner can display a set of calendar entries from different calendars which have an interrelationship that the user defines by data that is entered into the system interactively.

4. Co-pending application Ser. No. 008,249, filed Jan. 29, 1987, entitled "Method For Automatically Reconciling Entries on Two Copies of Independently Maintained Electronic Calendars," and assigned to the assignee of this application is directed to an electronic calendaring method in which a calendar owner who keeps a detached personal copy of his master calendar can automatically reconcile the calendar entries that have been made on each calendar copy, independently of the other since the last time the detached copy was made and interactively resolve calendar event conflicts.

5. Co-pending application Ser. No. 008,038, filed Jan. 29, 1987, entitled "Electronic Calendaring Method Which Provides for Automatic Assignment of Alternates In Requested Events," and assigned to the assignee of this application is directed to an electronic calendaring method in which a calendar owner, who receives a request to participate in a calendared event originated by another calendar owner, can assign an alternate to the event that will be designated in the automatic response which reflects the assignment of an alternate to the event. The assignment of the alternate is based on the relationship of the information that accompanies the request and criteria that the calendar owner has pre-established for each potential alternate.

6. U.S. Pat. No. 4,807,155, issued Feb. 21, 1989, Ser. No. 008,036, filed Jan. 29, 1987, entitled "Electronic Calendaring Method for Automatic Confirmation of Resource Availability During Event Calendaring", and assigned to the assignee of this application is directed to an electronic calendaring method in which a calendar owner, when calendaring an event such as a meeting, which requires, in addition to a meeting room, such articles as a projector, video conferencing equipment, etc., automatically receives confirmation that requested articles are available and reserved for the calendared meeting event.

BACKGROUND OF THE INVENTION

1. Field of the Invention

This invention relates in general to electronic calendaring methods and in particular to an improved method to provide a calendar owners' replay to an electronic mail invitation to attend an event that is being calendared by another calendar owner.

2. Description of the Related Art.

The prior art has disclosed a number and variety of interactive electronic calendaring systems and method. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems.

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring arrangements generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network that has been established to permit the users to interact with each other and with data maintained on the data processing system. In this environment, a user at a terminal or workstation can send a message to one or more of the other users on the network and is notified when the addressees has received and read the message.

In most of these environments, each user generally maintains a calendar, and in many of these environments the reason for the interaction with each other quite often generally involves reference to respective calendars. A considerable amount of time is therefore spent in many organizations, with people checking and rearranging their calendars to accommodate various events such as meetings, presentations, etc. In this environment, the calendar systems and method have progressed to the point where a person who is calling a meeting can at least review within the constraints that the security system dictates, the calendars of other users on the system that he intends to invite to a meeting, to determine whether a given time period is available on the respective calendars of the perspective attendees. However, once the meeting time is set and the prospective participants notified of the date, time, and subject of the meeting, each participant must update his own electronic calendar and reply to the meeting request. While the system can facilitate the request and reply message process, it is sometimes less frustrating when a negative reply has to be transmitted to merely use the telephone to arrive at another mutually convenient time. As a result, a considerable amount of time and effort is spent by calendar owners replying to requests for participation in events that are being calendared by other persons.

The cross reference applications describe various improvements to electronic calendaring methods for increasing productivity and making the overall system more appealing to the calendar owner by providing functions that the calendar owner came to expect and rely on when his calendar was being kept manually.

A problem that persists in multi-user systems is exemplified by the following typical scenario which can occur many times during a normal working day to a calendar owner working on a terminal. Assume that the end user calendar owner is working on a particular project at his terminal when he is notified by a message on his screen that he has just received an electronic invitation to an event being calendared by another user on the system that is to occur three weeks in the future. Assume further that the system can distinguish a meeting notice from other type of documents that are sent by the electronic mail function of the system, so that the message supplied to the calendar owner does indicate that it is a meeting notice but no other details are provided. This is typical of most systems currently in commercial use. In order to reply to the meeting notice the owner must interrupt the current project and have the message displayed in order to seen the meeting details, such as the person calling the meeting, the location, the subject, the date and time period. In some systems this might just require operating a predesignated key such as a function key on the keyboard or a "hot" key that has previously been established to display the meeting details in a window on the screen or on a new screen. In a less advanced system, the end user might be required to exit the current program that he was working under when the message notice was received in order to enter another program to view the details of the meeting invitation. After viewing the message, the owner then wants to view his calendar, particularly the period surrounding the date and time of the new meeting. The process of bringing up his calendar application generally involves a number of interactive steps which involve selecting options on menus and responding to prompts with data entered through the keyboard. Assuming there are no conflicts indicated when the appropriate day calendar screen is presented, and the owner was not interrupted during the process of getting the day screen displayed without forgetting all of the meeting details, the invitee can the update the calendar to reflect his intention to attend the meeting, exit the calendar program to the meeting notice, and send a reply which acknowledges acceptance of the invitation, and then bring up the interrupted application that he was working on at the time he received the notice.

The degree of frustration involved in responding to a meeting notice can in many situations result in the invitation being ignored or the reply being delayed which THEN causes calendar owners to use a manual back up system like the telephone to arrange and schedule meetings. The ultimate result is a loss of confidence in the calendaring system. The present invention is directed to a method to avoid the above cumbersome process of responding to a meeting notice.

SUMMARY OF THE INVENTION

The method of the present invention provides a calendar owner with a simple and effective method for responding to an electronic meeting notice by presenting to the calendar owner on one screen in a aside by side relationship, the details of the meeting notice and the relevant portion of of the owner's calendar, in responce to pressing a predesignated key, such as a "hot" key, or a function key. The method automatically builds the side by side display screen from the key data contained in the meeting notice. The date and time information from the meeting notice are employed by the system to retrieve the particular section of the invitee's calendar which is stored by the system. The day calendar is positioned on the screen with the start and end times of the requested meeting bracketing the horizontal central section of the computer. The meeting period may be highlighted on the invitee's screen in order to assist the calendar owner to recognize potential conflicts. The method permits the invitee to accept or reject the invitation by selecting one of the two options that are displayed on a command bar. The selection of the option accept, automatically updates the invitee's calendar so he is assured that the action has taken place, send the reply back to the meeting originator, and return the invitee to the point in the original application program that he was at when he responded to the message on the screen. The method of the present invention provides little or no opportunity for error and substantially no areas to cause frustration with the calendaring process.

It is therefore an object of the present invention to provide an improved electronic calendaring process.

Another object of the present invention is to provide an improved method for replying to electronic meeting notices.

A further object of the present invention is to facilitate the process of calendaring a meeting event by a calendar owner when responding to an electronic meeting invitation.

Objects and advantages other than those mentioned above will be apparent from the following description when read in connection with the drawing.

BRIEF DESCRIPTION OF THE DRAWING

FIG. 3 illustrates a display screen presented to an end user in response to a request to see a list of mail documents in the box.

FIG. 4 illustrates a side by side display of the meeting notice and owner's calendar presented to the owner in response to selecting a meeting on the screen of FIG. 3.

FIG. 5 is a screen similar to the screen of FIG. 4 after the event has been calendared.

DESCRIPTION OF THE PREFERRED EMBODIMENT

Figure 1:
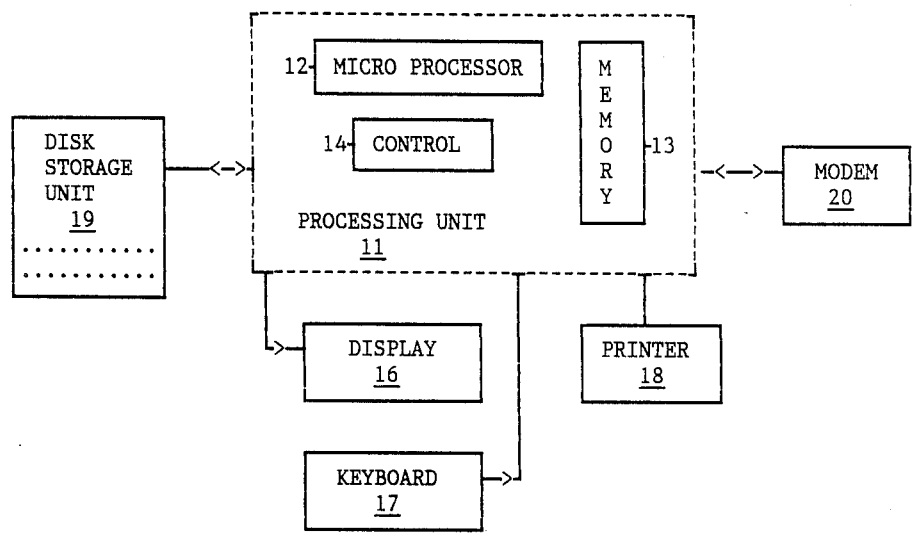
FIG. 1 is a block diagram of an interactive data processing terminal in which the electronic calendaring method of the present invention may be advantageously employed.

FIG. 1 illustrates the functional components of an interactive type data processing terminal on which the electronic calendaring method of the present invention may be advantageously employed. The terminal comprises a processing unit 11 which includes a microprocessor block 12, a semiconductor memory 13, and a control block 14 which functions to control input/output operations in addition to the interaction between the micro processor block 12 and the memory unit 13.

The terminal further includes a group of conventional peripheral units including a display device 16, a keyboard 17, a printer 18, a disk storage unit 19, and a modem 20. Since the details of the above-described functional blocks form no part of the present invention and can be found in the prior art, only a brief functional description of each block is set forth, along with a description of their interactions, sufficient to provide a person of ordinary skill in the art with a basis of understanding applicants' improved electronic calendaring method.

Processing unit 11 corresponds to the "system unit" of a personal computer system such as the IBM XT or IBM AT type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. Lastly, the modem 20 functions to transfer data from the terminal of FIG. 1 to a host system through one or more communication links which may be a commercial type link or a dedicated communication link.

Figure 2:
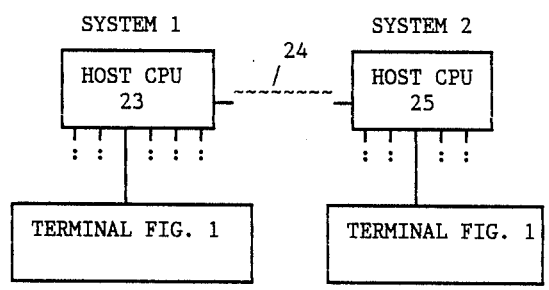
FIG. 2 is a block diagram of a network of terminals of the type shown in FIG. 1.

FIG. 2 illustrates a network 21 of interactive type workstations of the type shown in FIG. 1. As illustrated, the network includes a plurality of terminals which are interconnected with each other and to a host central processing unit 23, which in turn is connected via communication link 24 to a second host processing unit 25, which also connects to another network 26 of interactive workstations.

Functionally, the system operates to allow one terminal to communicate to one or more other terminals using established communication protocols, so that the various serially connected communication links are transparent to the operator. Such systems are well known in the art, and are currently in extensive commercial use. Since these communication links per se are not part of the present invention, only those details that are necessary for an understanding of the calendaring method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listings of individual calendar owners and shareable resources such as meeting rooms, etc., which require scheduling.

The system shown in FIG. 2 processes information as various types of data objects such as text data objects, graphic data objects, and calendar data objects. Each of these data objects are represented by a datastream which comprises a series of structured fields. The cross-referrenced applications may be referred to for the details of the various calendar objects and the various data structures that are employed by the system in implementing the overall electronic calendaring process and the general inter-terminal communication process which is often referred to as the electronic mail function.

The end user of the terminal may at any time request to see the list of electronic documents that are currently in the "In Box" of the node or the terminal. FIG. 3 is an example of the type of list that would be presented. As shown the list comprises four columns. The first column identifies the sender. The second column identifies the document label or a short description of the document. The third column defines the document type while the last column lists the date of the document.

The last line on the screen lists the functions of the function keys as a reminder to the terminal user. The second row of the screen lists the various options that are available to the end user when the screen is displayed. For example a selected document may be viewed by typing V, the first letter of the View command, the document having previously been selected by movement of a horizontal highlighting bar up and down on the screen to the line listing the desired document. Positioning the highlighting bar on the line containing the meeting notice and entering the letter V, produces the screen shown in FIG. 4.

As shown in FIG. 4, the meeting details are displayed on the left vertical half of the screen, while the section of the calendar relevant to the period of the meeting is displayed on the right vertical half of the screen. The meeting date, start time and end time are displayed as well as the location, the invitee's, subject and the meeting caller or inviter. The section of I.M Auser's calendar, namely the section for the date 12/10/87, is displayed in the normal format of the day calendar. As shown in FIG. 4 the format has a time slot for each 30 minute period extending from 8:00a to 5:00p. If the 30 minute period is open a series of dots appears after the time. If the period is not available, the name of the event or the reason appears in place of the dots. The period of the meeting, i.e. 1:00p to 2:30p is available and may be highlighted to assist in recognizing potential conflicts. If the invitee decides to attend the meeting, he advise the system to ADD the event to the calendar by selecting the Add option at the top of the screen. Various methods well known in the art may be employed such as a mouse positional pointing cursor or a highlighted command cursor to select the Add command.

FIG. 5 shows the result of selecting the Add command. The meeting has been entered into the calendar. In addition the system automatically sends a reply to the meeting caller J. Allen to advise him that I.M. Auser plans to attend the meeting. The system also returns the user back to the original screen which in the example being described is the mail list shown in FIG. 3. If the calendar owner had been working on a particular project using an application program and was advised by a message on the screen that a meeting invitation had just been put in the "In Box", the system would have returned to that application program so the calendar owner could proceed from the point that he left the application program to reply to the meeting invitation.

Figure 6A:
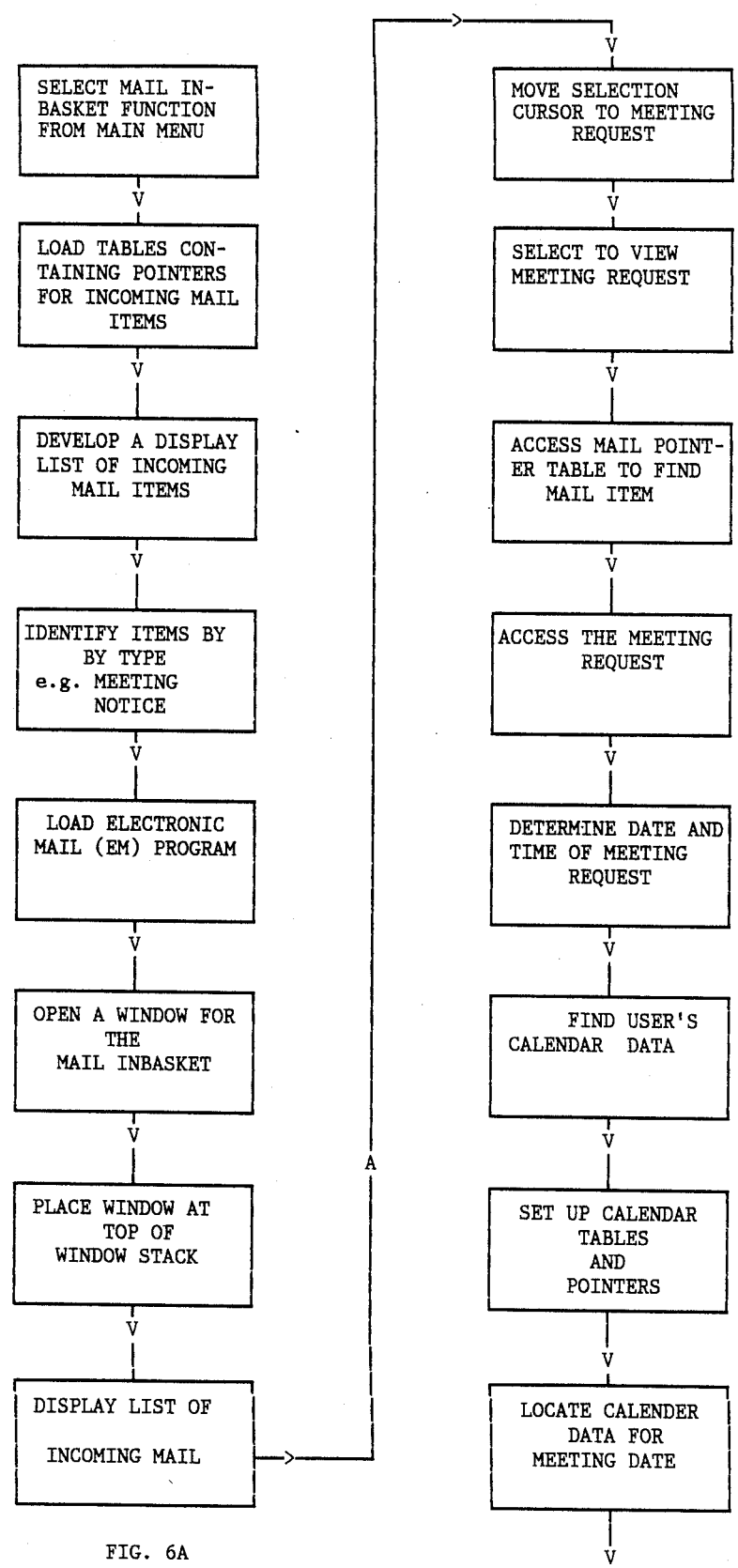
FIGS. 6A and 6B are flowcharts, illustrating various detailed steps involved in the improved electronic calendaring method.
Figure 6B:
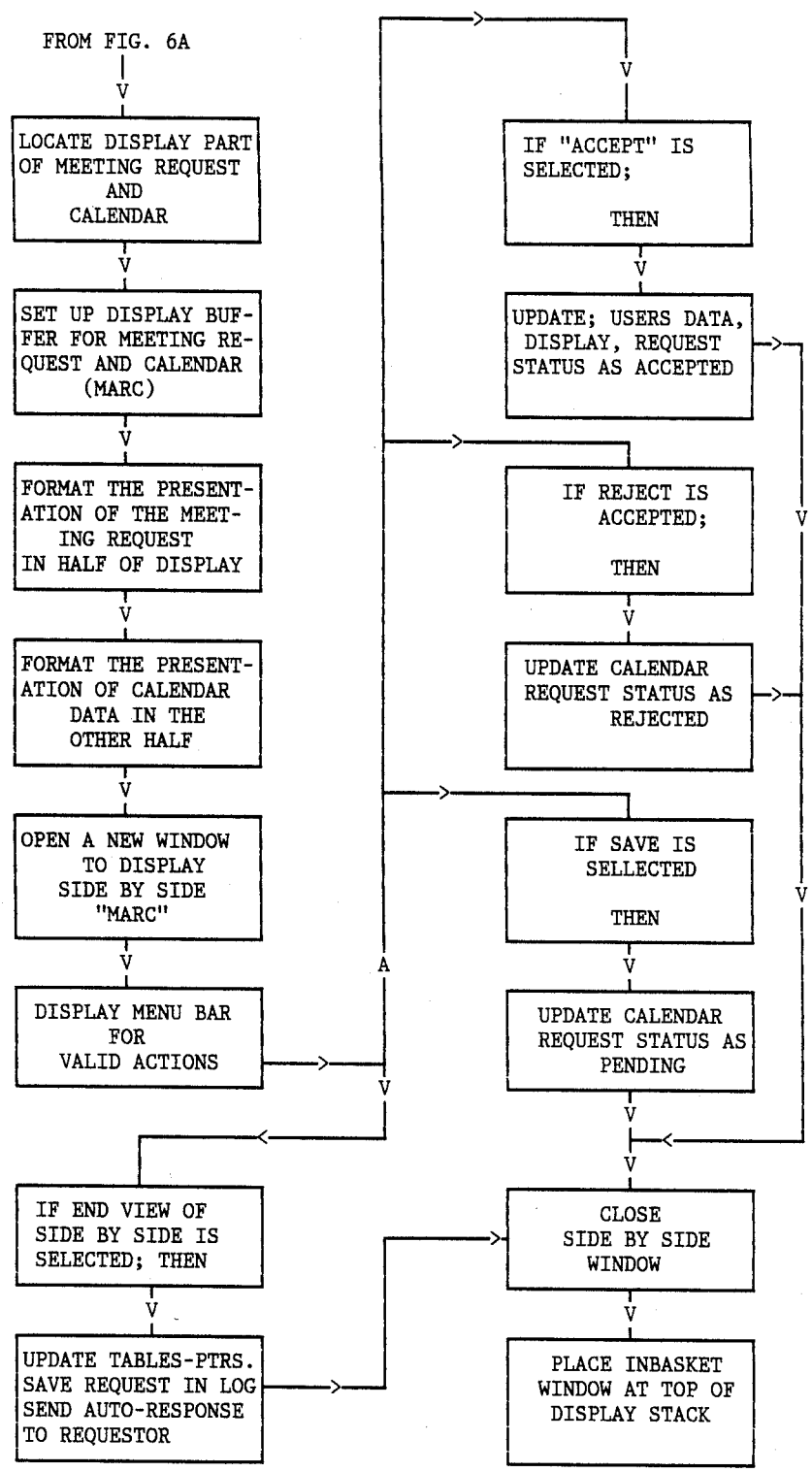

FIG. 6 is a flow chart illustrating the various detailed steps involved in the method of the present invention. The steps are at a level of detail to permit a person of ordinary skill in the art to practice the invention without undue experimentation and hence no further description is deemed necessary.

While applicants have disclosed only a preferred embodiment of the improved method, it will be apparent that changes and modifications may be made therein without departing from the spirit of the invention or the scope of the appended Claims.

We claim:

1. An electronic calendaring method for an information handling system which maintains electronic calendars for first and second end users and which comprises a plurality of interactive interconnected end user terminals, to facilitate the calendar entry and reply process by said first end user to an electronic invitation having schedule times issued by said second end user and received by said first end user, said method comprising the combination of the following steps:
   (A) issuing said invitation to said first end user,
   (B) displaying to said first end user a composite screen comprising the details of said invitation and a section of said first user's calendar corresponding to said schedule times, said section being selected automatically by said system based on said times and in response to a request by said first user to said system to display said invitation, and
   (C) providing to said second end user, a reply to said invitation, while said composite screen is being displayed in response to the interactive entry of data into said system by said first end user.

2. The method recited in claim 1 in which said invitation is to a meeting and said step of displaying said timing details includes the step of,
   (A) displaying the date of said meeting and the start time of said meeting.

3. The method recited in claim 2 in which said step of displaying said section includes the further step of,
   (A) showing the section of said calendar that correlates to the said date of said meeting and said start time of said meeting.

4. The method recited in claim 3 in which a first said end user terminal is assigned to said first end user including the further step of,
   (A) providing to said first user at said first terminal while said first terminal is actively running a non-calendar program, a predetermined indication that said electronic meeting invitation that was issued by said second user has been received at said first terminal, and
   (B) controlling said system to automatically display said composite screen in response to a predetermined operator interaction with said first terminal while said indication is displayed.

5. An electronic calendaring method for an information handling system which maintains electronic calendars for users of said system and which comprises a plurality of interactive interconnected end user terminals to facilitate for a first end user the reply process to an electronic invitation issued by a second end user to said first end user and facilitate entry of selected data contained in said invitation into the calendar of said first user, said method comprising the combination of the following steps:
   (A) issuing said invitation to said first end user by said second end user,
   (B) requesting on receipt of said invitation by said first end user the display of a composite screen comprising at least the timing details of said invitation and a section of said first user's calendar determined automatically by said system from said timing details to assist said first user in responding to said invitation,
   (C) displaying said composite screen at said first terminal in response to said step of requesting, and
   (D) entering a reply to said invitation into said system.

6. An electronic calendaring method for an information handling system which maintains electronic calendars for first and second end users and which comprises a plurality of interactive interconnected end user terminals, to facilitate the calendar entry and reply process by said first end user to an electronic invitation to a meeting issued by said second end user and received by said first end user, and in which a first end user terminal is assigned to said first end user, said method comprising the combination of the following steps:
   (A) issuing said invitation to said meeting to said first end user,
   (B) displaying to said first end user a composite screen simultaneously illustrating the details of said invitation including the date and start time of said meeting, and a section of said first user's calendar that correlates to said date and start time of said meeting as specified by said invitation.

(C) providing to said first user at said first terminal a predetermined indication that said electronic meeting invitation that was issued by said second user has been received at said first terminal, (D) controlling said system to display said composite screen, including the step of listing at least one option that is selectable interactively by said first user to reply to said invitation, (E) providing to said second end user, a reply to said invitation, while said composite screen is being displayed in response to the interactive entry of data into said system by said first end user.

7. The method recited in claim 6 in which said at least one option is to accept said invitation, including the further step of, (A) updating said first user's calendar automatically with said details of said meeting as displayed on said composite screen.

8. The method recited in claim 7 including the further step of, (A) sending said reply with said system to said second user in response to said first user interactively selecting said at least one option.

9. The method recited in claim 8 in which a first application program is being run by said first user at the time said invitation is received, including the further steps of, (A) interrupting said first application program to respond to said invitation, and (B) returning said system to said first application program automatically after said step of updating is completed.

10. A method of assisting an operator of an interactive display terminal which is connectable to an information handling system, in responding to an electronic invitation sent to said operator at said terminal, said method comprising in combination, (A) providing a calendar program for said system to maintain an electronic calendar for said operator, and for displaying to said operator, an electronic invitation to an event including timing details of said event, (B) indicating to said operator with said terminal that an invitation to an event has been received, and (C) displaying said invitation, in response to an interactive command from said operator to said terminal, along with a section of said operator's calendar that was automatically selected by said system, based on said timing details of said event, whereby all the information available for said operator to respond to said received invitation is displayed concurrently to said operator.

* * * * *